United States Patent [19]

deJong et al.

[11] Patent Number: 5,510,877

[45] Date of Patent: Apr. 23, 1996

[54] METHOD AND APPARATUS FOR LATERAL REGISTRATION CONTROL IN COLOR PRINTING

[75] Inventors: Joannes N. M. deJong, Suffern; Jan Bares, Webster; Vittorio R. Castelli, Yorktown Heights, all of N.Y.

[73] Assignee: Xerox Corporation, Stamford, Conn.

[21] Appl. No.: 230,469

[22] Filed: Apr. 20, 1994

[51] Int. Cl.$^6$ .................................................. G03G 21/00
[52] U.S. Cl. ........................... 355/208; 355/203; 355/204; 355/207
[58] Field of Search .................... 355/203, 204, 355/207, 208, 211, 212, 326 R, 327; 226/15, 45; 198/806, 807, 808, 810; 474/102; 346/157

[56] References Cited

U.S. PATENT DOCUMENTS

| | | |
|---|---|---|
| 3,957,367 | 5/1976 | Goel . |
| 4,135,927 | 1/1979 | Draugelis et al. . |
| 4,188,110 | 2/1980 | Stange . |
| 4,236,809 | 12/1980 | Kermisch . |
| 4,336,994 | 6/1982 | Banton . |
| 4,370,047 | 1/1983 | Damouth et al. . |
| 4,403,848 | 9/1983 | Snelling . |
| 4,403,877 | 9/1983 | Jones et al. . |
| 4,557,372 | 12/1985 | Rajagopai . |
| 4,833,503 | 5/1989 | Snelling . |
| 4,959,040 | 9/1990 | Gardner et al. ..................... 198/807 X |
| 4,961,089 | 10/1990 | Jamzadeh ............................. 355/326 X |
| 4,965,597 | 10/1990 | Ohigashi et al. ................... 355/327 X |
| 4,977,411 | 12/1990 | Pepe . |
| 5,053,826 | 10/1991 | Castelli et al. . |
| 5,119,147 | 6/1992 | Hays . |
| 5,146,279 | 9/1992 | Seyfried . |
| 5,153,644 | 10/1992 | Yang et al. . |
| 5,200,791 | 4/1993 | Dastin et al. . |
| 5,208,796 | 5/1993 | Wong et al. . |
| 5,225,900 | 7/1993 | Wright . |
| 5,227,270 | 7/1993 | Scheuer et al. . |
| 5,229,787 | 7/1993 | Rees et al. . |
| 5,248,027 | 9/1993 | Kluger et al. . |
| 5,266,976 | 11/1993 | Ohigashi et al. ................... 355/208 X |
| 5,287,162 | 2/1994 | de Jong et al. .................... 355/326 R |
| 5,373,355 | 12/1994 | Ando et al. ............................ 355/327 |

*Primary Examiner*—Matthew S. Smith
*Attorney, Agent, or Firm*—Fay, Sharpe, Beall, Fagan, Minnich & McKee

[57] ABSTRACT

A method and apparatus is provided for controlling the transverse registration of an image area to be exposed on a longitudinally moving belt by providing belt edge profile data, detecting a lateral position of the belt during movement of the belt by measuring the lateral position of the belt edge, and adjusting the transverse location of the image on the belt to compensate for a difference between the detected lateral belt edge position and the belt edge profile data. In addition, a method and apparatus is provided for controlling the lateral position of a longitudinally moving endless belt by generating a steering command signal by calculating a difference between the detected first lateral position of the belt edge and the belt edge profile data corresponding to the first longitudinal position, and adjusting the lateral position of the belt by steering the belt in response to the steering command.

16 Claims, 9 Drawing Sheets

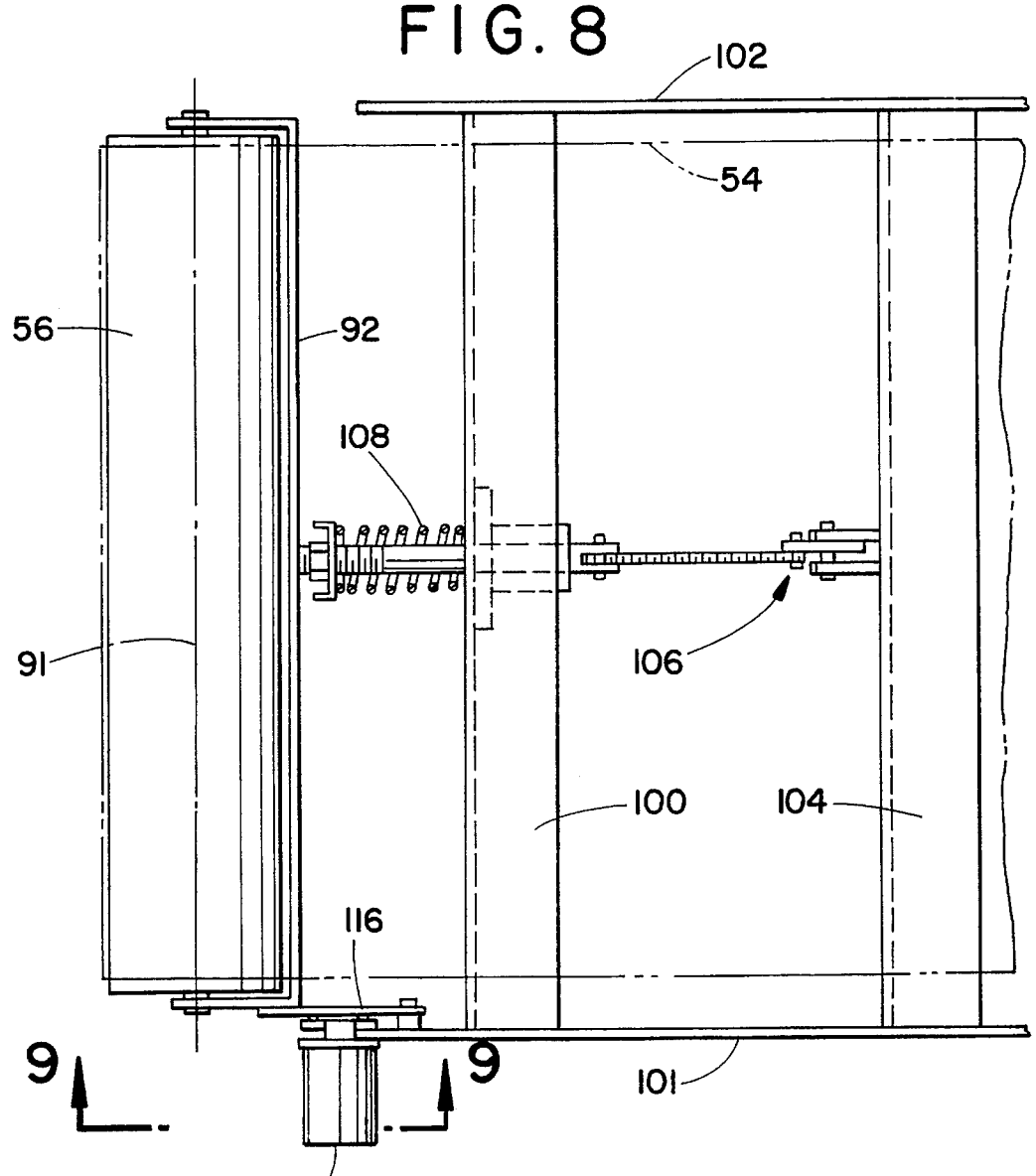
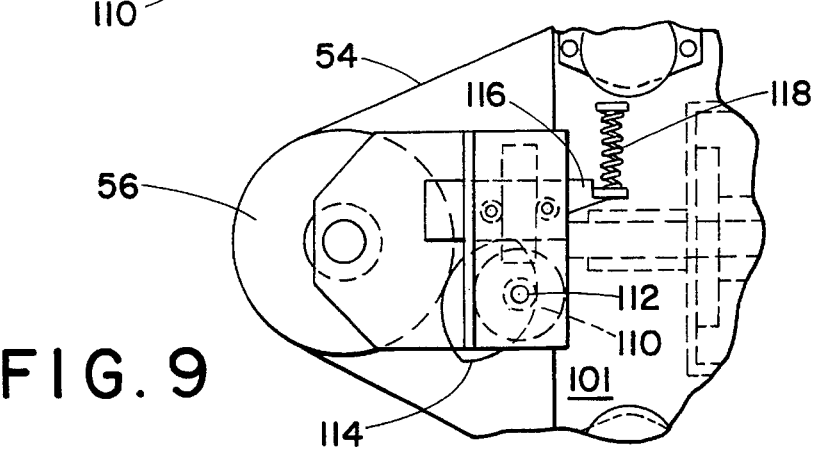

METHOD AND APPARATUS FOR LATERAL REGISTRATION CONTROL IN COLOR PRINTING

BACKGROUND OF THE INVENTION

1. Field of the Invention

The present invention relates to methods and apparatus for controlling the position of a longitudinally moving belt and, more particularly, to such methods and apparatus by which the belt may be controlled with high precision. The present invention also relates to methods and apparatus for controlling lateral image registration on a longitudinally moving belt.

2. Description of the Related Art

In digital methods for providing color images by xerography, for example, each image area on a photoconductive belt must make at least four passes relative to a transverse line scan by a modulated laser beam or a linear array of light emitting diodes and registered to within a maximum of a 0.1 millimeter circle or within a tolerance of ±0.05 mm. Source imaging methods require specifications that could be four (4) times as stringent, i.e., a 0.025 mm circle or ±0.0125 mm tolerance. The use of timing marks spaced longitudinally on the belt in correspondence with the image areas, coupled with available electronic sensors and associated circuitry has enabled longitudinal registration of the image areas, or registration in the direction of belt travel, acceptably within this degree of precision. Registration of image elements or "pixels" in a transverse direction, or in a direction perpendicular to the direction of belt travel, has been more difficult to attain due to manufacturing tolerances in belt width, supporting roller geometry, uneven belt stretch or a combination of such tolerances. As a general rule of thumb, to achieve this degree of registration precision in the transverse direction, the change of lateral position of the photoconductor (PR) belt may not exceed ±0.25 mm over three consecutive images. Overall, the lateral belt position must be held in a range of about ±0.1 mm.

Although many types of steering systems have been devised for maintaining alignment of endless belts generally, recent developments in belt tracking control for copiers and printers have been inclined to "active" steering systems in which an electric motor drive tilts the steering roll in response to controller commands. With the help of signals from an opto-sensor, a micro processor controller determines once in each belt revolution whether the belt is on one side or the other of the set point position. Corrective steering commands are then deduced from the combination of the relative belt position and the number of iterations according to a specialized set of control rules. This system achieves lateral control within ±0.3 mm.

A diagonal line sensor has recently been applied to belt tracking control called "phase plane control," using a similar mechanism. Belt position is proportionally measured once per revolution, and the additional information thus available from the diagonal line sensor enables improved corrective action. Steering commands are deduced from the combination of position, its rate of change, and the number of iterations according to a specialized set of control rules. This system has a position measuring range of 14 mm peak-to-peak, but the displacement rate is maintained low enough to achieved an error of 0.3 mm over consecutive color separations.

U.S. Pat. No. 4,557,372 discloses an alignment apparatus for a belt system which is representative of belt control schemes that rely on independent measurements of two or more target patterns on the belt. In these types of systems, lateral displacement of each individual target is sensed and a displacement signal input to a belt steering device. The major difficulty with this type of belt alignment control is that the accuracy of alignment is dictated by the accuracy of the individual targets on the belt. In order to achieve target precision within ±0.1 mm, the costs of manufacturing the belt and providing the targets becomes excessive.

Current color printers use relatively thin and fragile plastic film based photoconductive belts. These belts are produced as long continuous coated strips. The finished photoconductive belt is made by slitting the strip to width, cutting to length, die-punching slits and holes as required, and joining by means of a seam to make a loop. Such manufacturing processes do not contribute to the kind of precision required of belt-carried indicia to provide belt alignment within 0.1 mm using existing belt steering technology.

U.S. Pat. No. 5,208,796 proposes a method and apparatus for transverse registration of image exposures on photoconductive belts subject to lateral deviation from linear travel in which targets, corresponding in location to the image areas to be exposed, are used for the detection of lateral belt displacement and to control the transverse location of exposure scans. The targets are of a pattern defining a reference line and a line inclined with respect to the direction of belt travel so that the duration of time between passage of the target lines with respect to a spacially fixed sensing axis will vary with lateral displacement of the belt. The targets may assume a variety of specific patterns and the teachings of that patent are applicable to single and multi-pass image exposure systems as well as to both modulated laser and light emitting diode types of raster output scanners or other exposure devices.

It has been found that freshly replaced or new continuous belts of the type described above seem to converge to a quasi-steady state whereat an average edge profile can be computed. This quasi-steady state in lateral belt edge deviation is realizable using tracking control algorithms well-known to those skilled in the art. However, actual tests reveal edge position fluctuations having peak values of about 0.5 mm, which does not meet published registration requirements for quality color printing. Major contributors to these apparently random wanderings of the belts are believed to be run out of the belt module rolls and imprecise steering roll control.

A major disadvantage of the above belt tracking control mechanisms, methods and algorithms is that they are not accurate enough to maintain the lateral belt position to within the range of about ±0.1 mm.

Accordingly, there is a need for methods and apparatus for lateral registration control of an endless belt which are accurate, inexpensive and suitable for use in such applications as color printing. Furthermore, such methods and apparatus should be capable of use with new or freshly replaced belts which tend to naturally migrate from a quasi-steady state at a first rate over a period of time, as well as with older belts which can migrate or otherwise randomly wander at a different second rate through continued use thereof.

SUMMARY OF THE INVENTION

The present invention contemplates new and improved methods and apparatus for lateral registration control of a moving belt which overcome the above-referenced problems and provide sufficient accuracy for such applications as color printing.

According to the present invention, an apparatus and method is provided for controlling the transverse registration of an image area to be exposed on a longitudinally moving continuous belt subject to lateral deviation from linear travel.

According to another aspect of the present invention, an apparatus and method is provided for controlling the lateral position of the longitudinally moving endless belt subject to lateral deviation from linear travel.

According to a more limited aspect of the present invention, the method for controlling the transverse registration of an image area to be exposed on a longitudinally moving belt includes steps of providing belt edge profile data, detecting a lateral position of the belt during movement of the belt by measuring the lateral position of the belt edge, and adjusting the transverse location of the image on the belt to compensate for a difference between the detected lateral belt edge position and the belt edge profile data. The apparatus for controlling the traverse registration of an image area to be exposed on a longitudinally moving belt includes a processing unit for providing the belt edge profile data, an edge position detector for detecting a first lateral position of the belt during movement of the belt by measuring the lateral position of the belt edge at a first of a plurality of longitudinal positions along the belt, and an output scanner control means for adjusting the transverse location of the image area on the belt to compensate for a difference between the detected first lateral position of the belt edge and the belt edge profile data.

According to a yet more limited aspect of the invention, the method for controlling the lateral position of a longitudinally moving endless belt includes the steps of providing belt edge profile data, detecting a lateral position of the belt during movement of the belt by measuring the lateral position of the belt edge at a first longitudinal position along the belt, generating a steering command signal by calculating a difference between the detected first lateral position of the belt edge and the belt edge profile data corresponding to the first longitudinal position, and adjusting the lateral position of the belt by steering the belt in response to the steering command. The apparatus for controlling the lateral position of the longitudinally moving endless belt includes a processing unit storing the belt edge profile data, an edge position detector for detecting a first lateral position of the belt during movement thereof by measuring the lateral position of the belt edge at a first of a plurality of longitudinal positions along the belt, a lateral registration controller for generating a steering command signal by calculating a difference between the detected first lateral position of the belt edge and the belt edge profile data corresponding to the first longitudinal position, and a guide roller for steering the belt in response to said steering command signal.

According to yet still a further aspect of the invention, transverse registration of an image area to be exposed on a longitudinally moving photoconductor belt which is subject to lateral deviation from linear travel is achieved by detecting the lateral position of the belt, and adjusting the transverse location of the image area on the belt to compensate for the distance between the detected lateral position of the belt and a previously stored historical moving average belt edge position signature information. As applied to transverse registration of multiple image exposures of a given image area on a photoconductive belt by successive presentation of that image area to a transverse line scanning device, the lateral position of the belt for each of the multiple exposures is detected and the scanning device is adjusted for each of the succeeding presentations as needed to account for deviation of the transverse position of the belt during each succeeding exposure.

In accordance with another aspect of the invention, as embodied and broadly described herein, the invention comprises a method for controlling a lateral position of a longitudinally moving endless belt by measuring belt edge displacement from a spatially fixed reference point a plurality of times during each revolution of belt movement to provide a set of data relating the belt edge position with a plurality of longitudinal positions along the belt. For each longitudinal position, a current value of measured displacement is obtained whereupon the current value of measured displacement and at least one prior value of measured displacement is averaged to provide a current moving average value of measured displacement. A difference between the instantaneous belt edge position, and the current moving average value of measured displacement is calculated to provide a belt steering correction command signal for each longitudinal position along the belt. The belt is steered in accordance with the belt steering command signal as necessary to reduce the current average value of measured displacement as close to zero as possible.

The invention may be embodied in a multi-pass belt exposure system in which a given image area is presented successively to a single scanning device by multiple belt revolutions or in a single pass system in which an image area is presented successively to a plurality of longitudinally spaced scanning devices.

Also, the invention is adapted for use with laser and light emitting diode types of transverse scanning device or raster output scanners. Where the scanner employs a modulated laser beam to define a transverse line of scan, lateral shifting of the image exposure, in response to the difference between the detected lateral position of the belt and the previously stored moving average edge position signature information, is effected electronically by starting and ending the active or modulated segment of each line scan at points corresponding to the detected difference. In the case of a raster output scanner such as a linear array of light emitting diodes, a combination of electronically displacing the line of scan and physical shifting of the diode array is used. In such scanners, where the electronic control is restricted to an increment of length corresponding to the diameter of a given light emitting diode, a course image shift is effected by electronically shifting between the respective LEDs to start and end the transverse scan line in a manner similar to that described with respect to a laser. Fine shifting of the LED array, however, is effected by physical shifting of the array rack using a electro-mechanical device such as a piezoelectric stack, or other forms of linear electronically controlled drive devices well known in the art such as motor activated servo systems.

In light of the foregoing, a primary advantage of the present invention is the provision of an improved method for attaining transverse registration of an image exposure on a longitudinally traveling photoconductive belt by which the problems associated with lateral deviation from linear travel of such belts are substantially overcome. Another advantage of the present invention is the provision of a highly effective apparatus for implementing such a method.

Another object of the invention is to provide such a method and apparatus for assuring transverse registration of successive image exposures on such belts.

A further object of the invention is the provision of an improved method and apparatus for detecting lateral displacement of a longitudinally moving belt at spaced increments of the belt length.

A still further object of the invention is to provide a method and apparatus for detecting the lateral position of a photoconductive belt in relation to an image area during a first and successive multiple exposures by a transverse scanning device and adjusting the effective scan location of that device so that the first and each successive image are in precise registration with each other.

Yet another object of the invention is the provision of such a method and apparatus which is adaptable to and includes diverse types of such transverse scanning devices and scanning procedures.

Another object of the present invention is to provide a method and apparatus for maintaining an endless photoconductor belt to within lateral position variations smaller than the manufacturing tolerances allowed in forming the belt.

Still yet another object of the invention is to provide an alignment control method and apparatus for endless photoconductive belts by which the lateral position of such belt can be maintained within a 0.1 mm circle.

Additional advantages and objects of the invention will be set forth in part in the description which follows, and in part will be obvious from the description, or may be learned by practice of the invention. The objects and advantages of the invention will be realized and attained by means of the elements and combinations particularly pointed out in the appended claims.

DESCRIPTION OF THE DRAWINGS

The accompanying drawings, which are incorporated in and constitute a part of this specification, illustrate exemplary embodiments of the invention and together with the description, serve to explain the principles of the invention. In the drawings:

FIG. 8 is a fragmentary, largely schematic plan view of the mechanism shown in FIG. 7;

FIG. 9 is a slightly enlarged fragmentary cross section on line 9—9 of FIG. 8;

DESCRIPTION OF THE PREFERRED EMBODIMENTS

Figure 1:
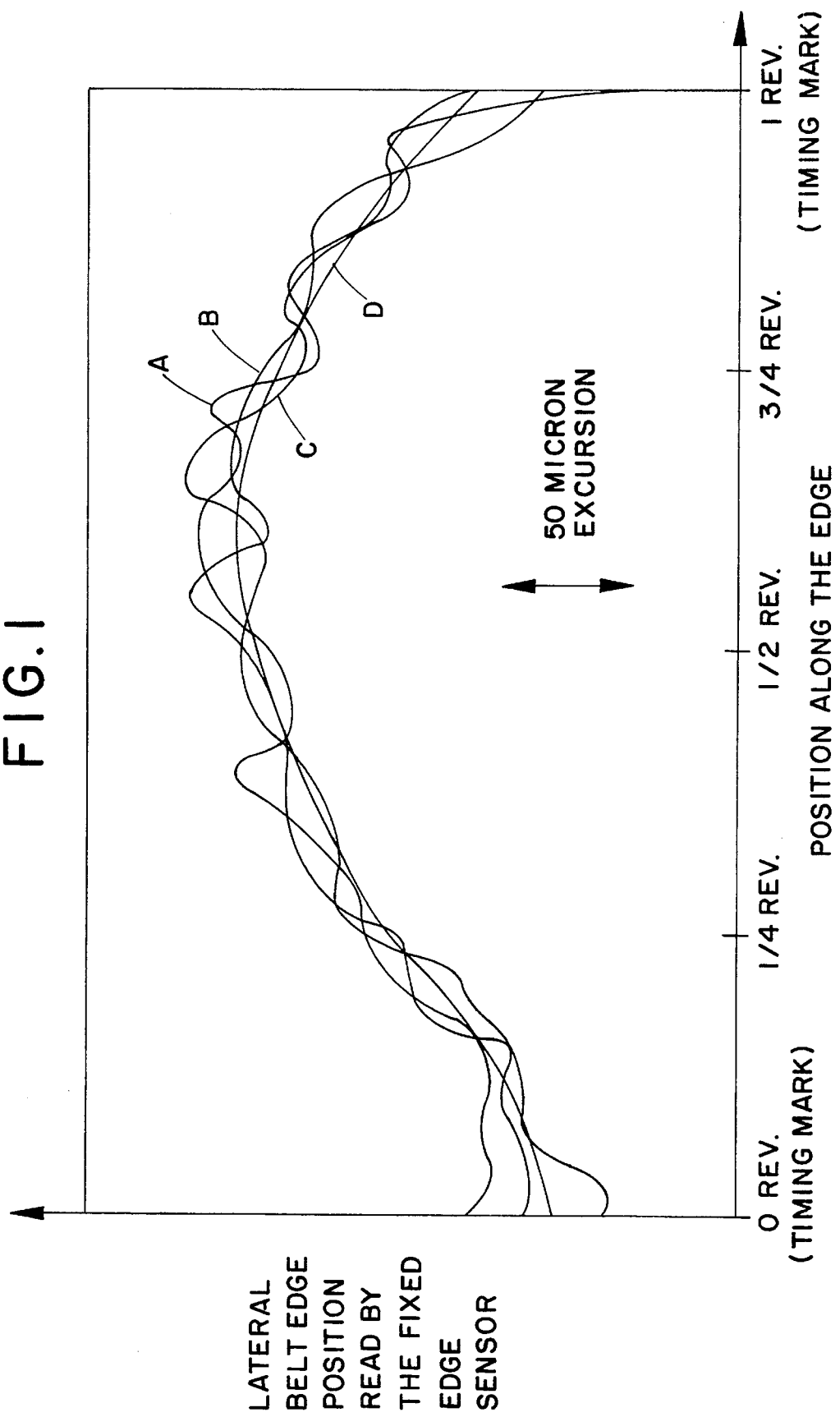
FIG. 1 is a graph illustrating the lateral fluctuations of a typical belt edge observed over a number of belt revolutions or cycles.

Reference will now be made in detail to exemplary embodiments of the invention illustrated in accompanying drawings. Wherever possible, the same reference characters will be used throughout the drawings to refer to the same or like parts.

OBSERVED TYPICAL BELT BEHAVIOR

The typical lateral deviation of a standard photoconductive belt of the type discussed above is illustrated in FIG. 1 of the drawings. More precisely with regard to that FIGURE, gross lateral fluctuations of the belt itself are inferred from the position of the belt edge, which position is detected by an electro-optical or electro-mechanical sensor as the belt advances therepast. Since the belt under consideration here is continuous, each of the curves A, B and C represents the lateral belt edge position detected by a stationary fixed edge sensor as the belt transverses a single complete course therepast. The lateral belt edge position detected by the edge sensor is plotted on the ordinate and the position along the continuous length of the belt in units of revolutions is plotted on the abscissa. Accordingly, if the curves A, B and C are detected and plotted sequentially and uninterrupted for successive belt revolutions, the trailing end of curve A (1 REV) should match the leading end of curve B (0 REV) with respect to belt position detected by the sensor. Also, the trailing end of curve B (1 REV) should match the leading end of curve C (0 REV). The curves in the FIGURE, however, are not plotted sequentially.

Ideally, were the belt perfect, each of the curves A, B and C would overlay one another and the end of each curve as illustrated in the chart would blend smoothly with its beginning. However, this is not the case. Indeed, as can be seen in FIG. 1, although there is no scale of the ordinate, from each belt cycle to the next, the difference between the detected lateral position, or fluctuation, may well exceed the registration requirements mandated for color printing. The curves also indicate that the difference in belt registration are both frame-to-frame and intraframe assuming a multipass system and a large enough image area on the length of the belt.

It has been observed that a "quasi-steady state" exists in typical belt systems as represented in FIG. 1 whereat, for all practical purposes, the belt deviation does not change significantly within as many as five (5) to ten (10) belt cycles. That is, the ends of the curves have the same lateral position as the beginning of the curves except for "small" lateral fluctuations during the curves within a single revolution. The curves illustrate that the durations for the extreme or most pronounced fluctuations are much shorter than a full revolution.

With continued reference to FIG. 1, the curves A, B and C represent typical lateral belt edge positions detected for a moving belt controlled by a prior art registration controller effecting a steering control of the belt. Typically, the lateral deviation within belt cycles is unacceptable.

However, the present invention obtains an average belt edge position curve D which represents a moving average of the belt edge position curves of a most recent plurality of prior belt revolutions. Using this average curve, or ideal edge profile, average belt misregistration is reduced in a manner described in greater detail immediately below.

BASIC CONTROL ALGORITHM

Figure 2:
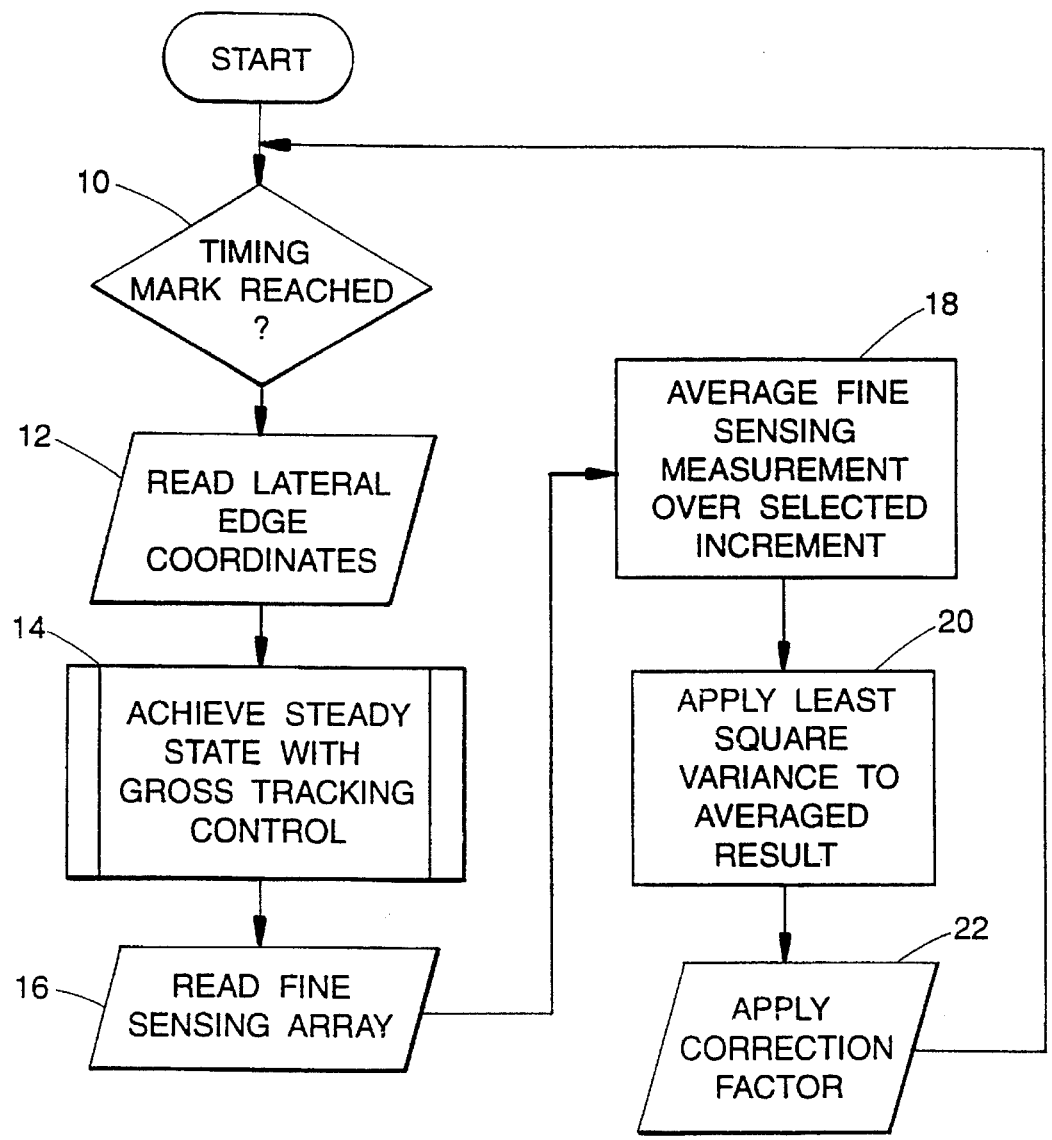
FIG. 2 is a flow chart illustrating the lateral registration control method of the invention.

Referring now to FIG. 2, the method for obtaining ideal edge profile data of belt edge signature information and using the data to apply a correction signal according to the present invention will be described in detail. At the first step 10, the control senses a timing mark on the belt passing under a belt edge sensing device. The timing mark is preferably a laterally extending seam in the belt but may also be any other suitable indicia printed or otherwise placed on the belt surface in a manner so as to cooperate with the sensor. The edge sensor is preferably an electronic sensing array which generates an electrical signal indication of the belt edge position with respect to a spatially fixed reference point.

Next, at step 12, a plurality of lateral belt edge positions are detected along equally spaced apart increments of longitudinal belt length. Each of the edge positions are associated with their respective longitudinal positions along the belt and stored in a memory. That is, as the belt advances a predetermined distance, e.g. two (2) inches in the preferred embodiment, the edge sensor reads a position of the belt and pair-wise stores that edge position associated with the corresponding longitudinal position along the belt circumference. The edge sensor reads a position of the belt at regular intervals of time and length such as by detecting the angular displacement of a drive or guide roller. This procedure produces an edge profile data set or edge signature defined by the accumulated edge profile data with respect to a position mark along the belt. In the preferred embodiment, forty (40) values are recorded for an eighty (80) inch belt.

Next, at step 14, the above-discussed quasi-steady state control is achieved using gross tracking control according to prior art methods and apparatus. The gross tracking control brings the belt into this quasi-steady state by continuously relaxing the speed and magnitude of the control interventions until all of the lateral belt deviations detected are below a threshold value.

Next, at step 16, the belt edge position is detected using a fine sensing array. The granularity of the fine sensing array for use with the instant invention is substantially less than that used for the prior art gross tracking control. The fine sensing array reads the edge positions in regular intervals of every two (2) inches along the belt circumference. These measurements are averaged 18 for each longitudinal belt position by the controller of the present invention over a selected number of belt revolutions or periods such as from five (5) to ten (10) or so belt revolutions in the preferred embodiment. A least square procedure is applied to the accumulated data to determine the variance thereof. For each belt revolution, a new set of belt edge positions is accumulated and included with the earlier averaged data. The belt position variance eventually stabilizes at a low level when the quasi-steady state is reached as indicated above. It has been found that although long term drift occurs, short term drift such as between successive images in a multi-pass system has little effect on the image formed thereon. When the overall belt edge position variance is detected to be stabilized below a predetermined minimum, the control is satisfied that the belt has reached the quasi-steady state and begins to execute belt position and/or image registration control.

Having thus achieved the quasi-steady state, the edge sensor reads a position of the belt edge at regular intervals of time and length along the belt, such as at every two (2) inches along the belt circumference, and derives a value at each position which may be different from the previously accumulated average belt edge position. The most-recently-obtained belt edge position is added to the accumulated average position data and averaged therewith to effect a moving average. Also, the most recently accumulated belt edge position is compared against the moving average to obtain a difference signal. At step 22, this difference signal is applied to an image registration apparatus or a belt steering apparatus to effect a correction tending to urge either the belt itself or the image registered thereon back toward the accumulated moving average. Thus, whenever the edge sensor detects that the edge is not in conformity with the "average" ideal edge profile, the control system produces a corrective action to restore the system to the historical moving average.

Since the edge position fluctuations appear to be random, correcting the belt position or raster output scanner position relative to the ideal edge profile does not guarantee that any single fluctuation of the registration is completely eliminated. However, since the ideal edge profile computed by the control system according to the present invention is the average and therefore the most probable edge position, the control interventions reduce the average misregistration. According to the present invention, beneficial effects are realized, such as, for example, the frequency of the most objectionable fluctuations i.e. those exceeding 0.050 mm, are significantly reduced.

The correction factor applied at step 22 may be utilized by either a tracking correction control such as a belt steering apparatus, a repositioning of a ROS bar or a timing change in a modulated laser imaging device. With current technology, belt tracking systems are not able to respond fast enough to the applied correction factor in some extreme situations. Accordingly, the apparatus for executing the correction according to the present invention includes a laterally moving raster output scanner ROS which restores the successive images applied to the multi-pass photoconductive belt passing thereunder.

IMAGE REGISTRATION CONTROL USING MOVABLE LED ARRAY

Figure 3:
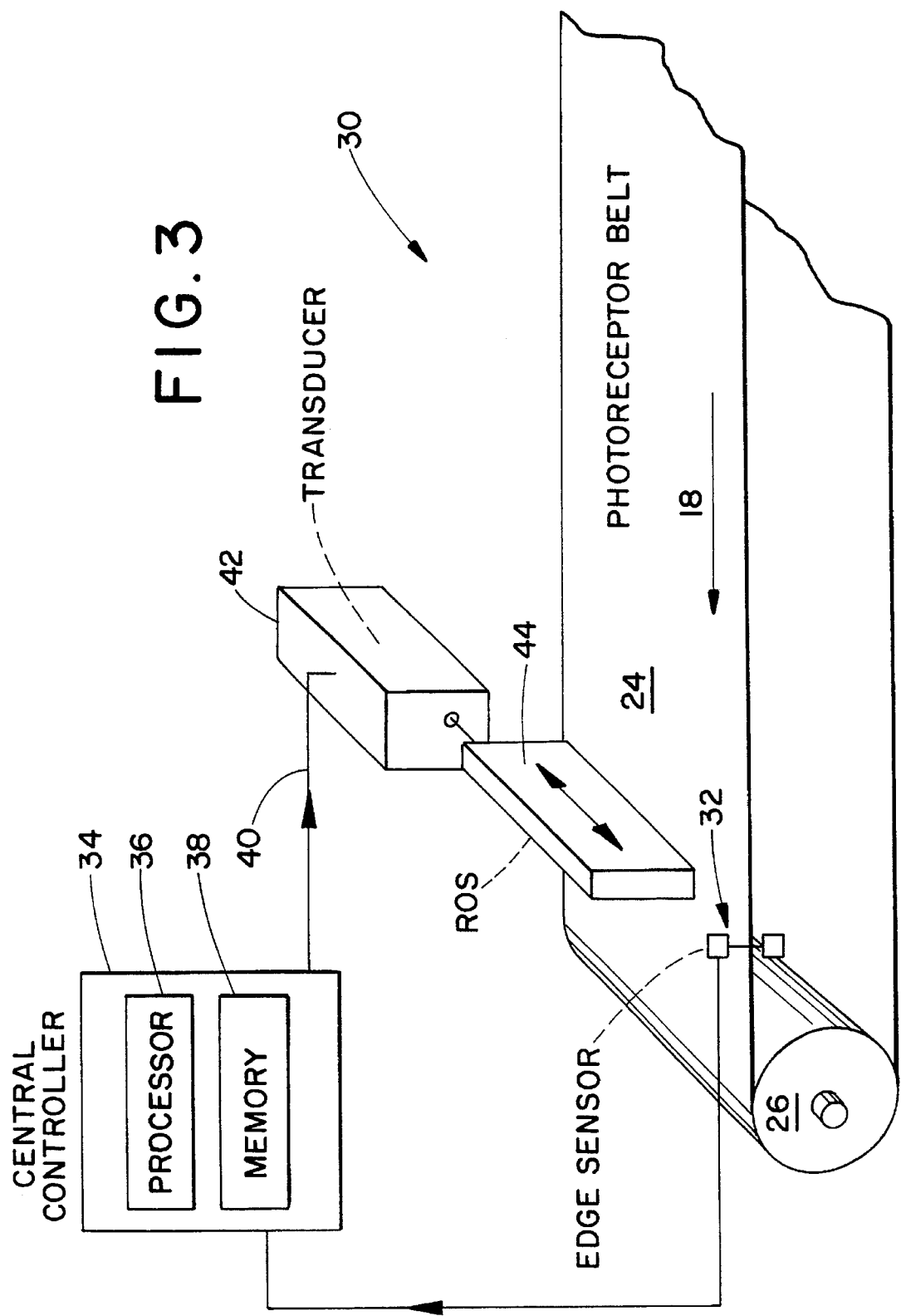
FIG. 3 is a schematic perspective view illustrating a system incorporating an embodiment of the invention and for providing for multiple exposures on a photoconductive belt by multiple passes of image areas on the belt in relation to a single laterally movable LED-type raster output scanner.

A schematic perspective view illustrating a system incorporating a first embodiment of the present invention is shown in FIG. 3. The system illustrated provides multiple exposures on a photoconductive belt by multiple passes of image areas on the belt in relation to a single laterally displaceable LED-type raster output scanner ROS.

The image registration control system 30 includes a belt edge position sensor 32 which is electrically connected to a central controller 34. The central controller includes a processor 36 for calculating an average belt position profile as described above. Also, a memory 38 is included within the central controller 34 for storing the moving average edge position data and other data necessary to effect the control.

As described above, for each equally spaced increment longitudinally along the belt, the central controller 34 performs an analysis of the most recently obtained belt edge position data with respect to a previously stored moving average data profile stored in the memory 38. An error correction signal is obtained based upon a difference between the detected position and the average position, which signal 40 is applied to a transducer 42. The transducer 42 reacts to the error correction signal 40 in a manner which compensates for the difference between the detected edge position and the average edge position to move or otherwise laterally displace the raster output scanner ROS 44.

In accordance with this preferred embodiment of the present invention, signals indicating instantaneous deviation of belt travel from the quasi-steady state average position developed by the central controller 34 are used to determine the precise transverse location of the first and subsequent successive image exposures in relation to the photoconductive belt 24. Also, precise intra-image registration is possible through proper selection of the longitudinal granularity of the data set.

The image registration control system 30 illustrated in FIG. 3 responds to the difference between the detected instantaneous belt edge position and the average position at regular intervals of time and length as described above. In the preferred embodiment, the error correction signal 40 is applied to the transducer for every two (2) inches of belt travel. According to this information, for a typical eighty (80) inch photoconductive belt, the ROS 44 is repositioned continuously so as to smoothly correct the error at forty (40) longitudinal positions of the belt.

Also, according to the algorithm described in connection with FIG. 2, the detected instantaneous belt edge position is "re-factored" into the running or moving average simultaneous with the repositioning of the raster output scanner 44.

Accordingly, image registration control is provided both intra- and inter-image.

IMAGE REGISTRATION CONTROL BY MODULATING LASER BEAM SCAN

Figure 4:
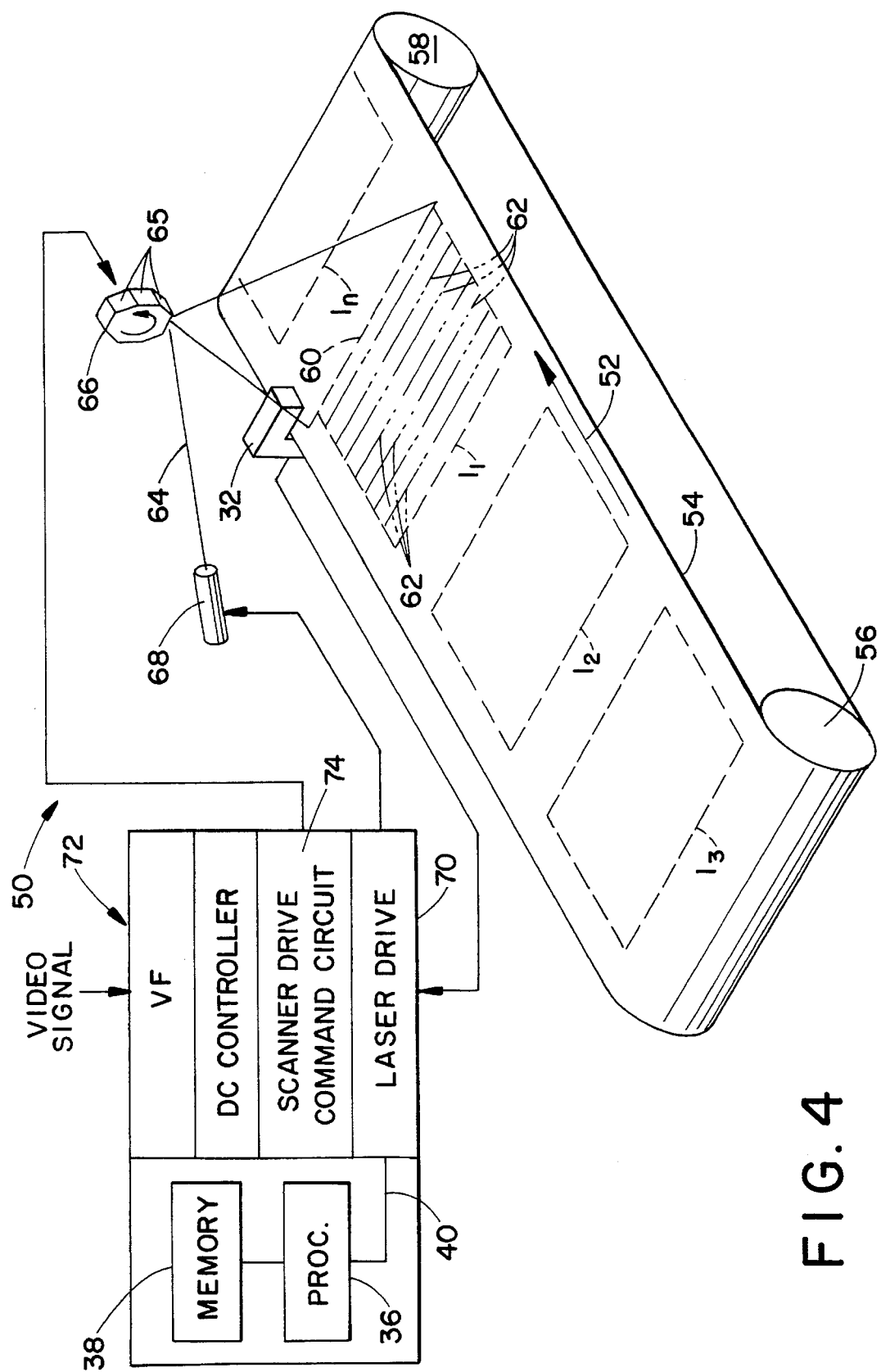
FIG. 4 is a largely schematic perspective view illustrating a system incorporating another embodiment of the invention and for providing multiple exposures on a photoconductive belt by multiple passes of image areas on the belt in relation to a single laser-type raster output scanner.

In FIG. 4 of the drawings, another embodiment of the present invention is illustrated in a multi-pass xerographic printing system depicted schematically and designated generally be reference number 50. The system 50 includes a photoconductive belt trained about guide rollers 56 and 58, at least one of which is driven to advance the belt 54 in a longitudinal direction of processing travel depicted by the arrow 52. The length of belt 54 is designed to accept an integral number of spaced image areas $I_1$–$I_n$ represented by dashed line rectangles in FIG. 4. As each of the image areas $I_1$–$I_n$ reaches a transverse line of scan, represented by a dashed arrow 60, it is progressively exposed on closely spaced transverse raster lines 62 shown with exaggerated longitudinal spacing on the image area $I_1$ in FIG. 4.

In the embodiment depicted in FIG. 4, the line 60 is scanned by a raster output scanner so that a modulated laser beam 64 is reflected to the line 60 by successive facets 65 on a rotatable polygon-shaped mirror 66. The beam 64 is emitted by a laser device 68 such as a laser diode, operated by a laser drive module 70 forming part of a control processor generally designated by reference numeral 72.

The processor 72 includes a memory and other circuit or logic modules indicated by legends in FIG. 4 and includes a scanner drive command circuit 74 by which operation of a motor (not shown) for rotating the polygon mirror 66 is controlled. The processor is suitably connected to the belt edge position sensor In the operation of the system 50, as thus far described, the processor 72 responds to a video signal to expose each raster line 62 in the same manner of a photoconductor segment. The video signal is used to expose four successive exposures, one for each of the three basic colors and black. In a multi-pass system such as the system 50, where one raster output scanner or head is used, complete exposure of each color image area requires four revolutions of the belt In FIG. 5 of the drawings, a single pass system 80, is depicted in which each of several image areas $I_1$–$I_4$, precise spacing of the raster output scanners in this fashion is not critical. Because of the need for charging and developing the image exposed by each raster output scanner, however, a substantial spacing between the scanners in the longitudinal direction of the belt is required.

Figure 5:
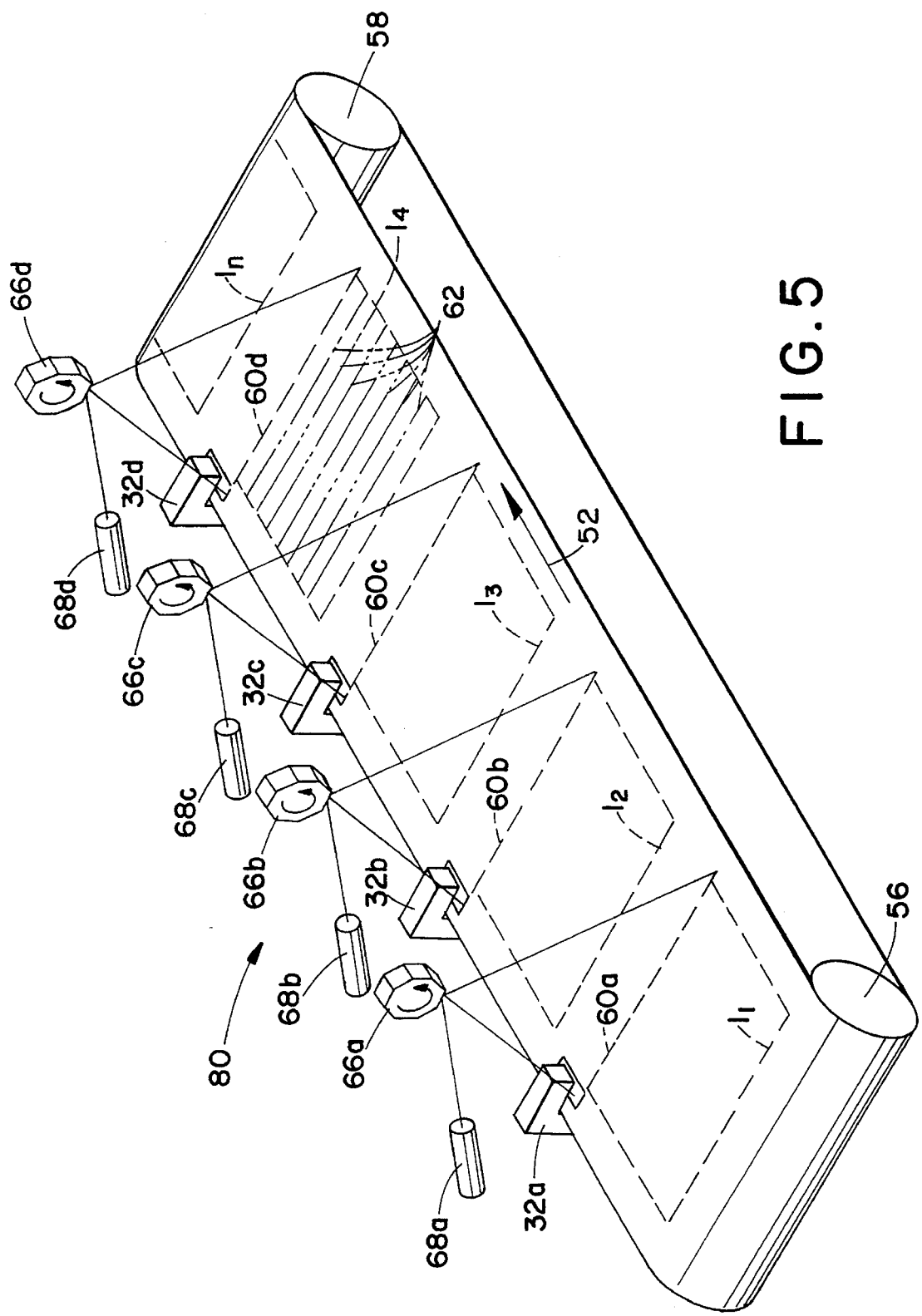
FIG. 5 is a perspective view similar to FIG. 4 but illustrating the invention in a system by which multiple exposures of an image area on a photoconductive belt are made by a single sequential pass of several laser-type raster output scanners.

A comparison of the multi-pass system of FIG. 4 with the single pass system of FIG. 5 will reveal that there is little difference in the manner by which each image area is successively subjected to multiple image exposures. In both systems, the image areas $I_1$–$I_n$ are successively exposed on successive raster lines 62 as each raster line registers with a transverse scan line 60 as a result of longitudinal movement of the belt 54. Although the distance of belt travel between successive scans would appear considerably less in the single pass system 50 of FIG. 4 than it is with the multi-pass system 80 in FIG. 5 as the belts are illustrated in these figures, in practice, the belt of FIG. 4 could be shortened to the length needed to accommodate one or two image areas so that the distance of belt travel between successive scans approaches that of the belt in the single pass system.

In FIG. 5 it is to be noted that the length of the transverse scan line 60 or transverse scan lines 60a–60d, in the respective systems 50 and 80, is longer than the transverse dimension of the image areas I. Scan line length, in this respect, is determined by the output scanner geometry and exceeds the length of the raster 62. The length of each raster line is determined by the time during which the laser diode is active to reflect a modulated beam from each facet 65 on the rotating polygon 66 as determined by the laser drive module 70 (not shown in FIG. 5). Thus, the active portion of each transverse scan line is shifted in a transverse direction by control of the laser drive module 70 according to the error correction signal derived as indicated above and the transverse position of the exposed raster lines 62, and image areas $I_1$–$I_n$ shifted in relation to the belts in the respective systems 50 and 80.

In accordance with these embodiments of the present invention, signals indicating instantaneous deviation of belt travel from the quasi-steady state average position are developed and used to determine the precise transverse location of the first and successive image exposures in relation to the photoconductive belt 54 and to adjust the active portion of the transverse scan line 60 for each succeeding image as needed to assure precise longitudinal alignment or transverse registration of the succeeding images with the first image irrespective of the lateral position of the belt during exposure of the images. This operation is achieved in the illustrated embodiments and in substantial measure by the provision of a single belt edge sensor 32 or a plurality of sensors 32a–32d for sensing the belt edge and for generating signals used to obtain average belt edge signature data for comparison against actual instantaneous belt edge signals for real time on-the-fly control.

REGISTRATION CONTROL USING BELT STEERING

In FIGS. 4 and 5 of the drawings, the general organization and flight path configuration of the photoconductor belt 54 was shown. The belt 54 is guided about fixed guide rollers, one or more of which may be driven to advance the belt 54 in the direction of the arrow 52. At one end of the endless belt loop, that is, the left end as illustrated in FIGS. 4 and 5, a belt steering roller 56 may be located. The steering roller is thus located so that the portion of the belt wrapped on the roller separates opposed major flights or runs in belt 54. Also, it will be noted that the steering roller 56 is located upstream from the edge sensor 32 in terms of the direction of belt travel.

Figure 6:
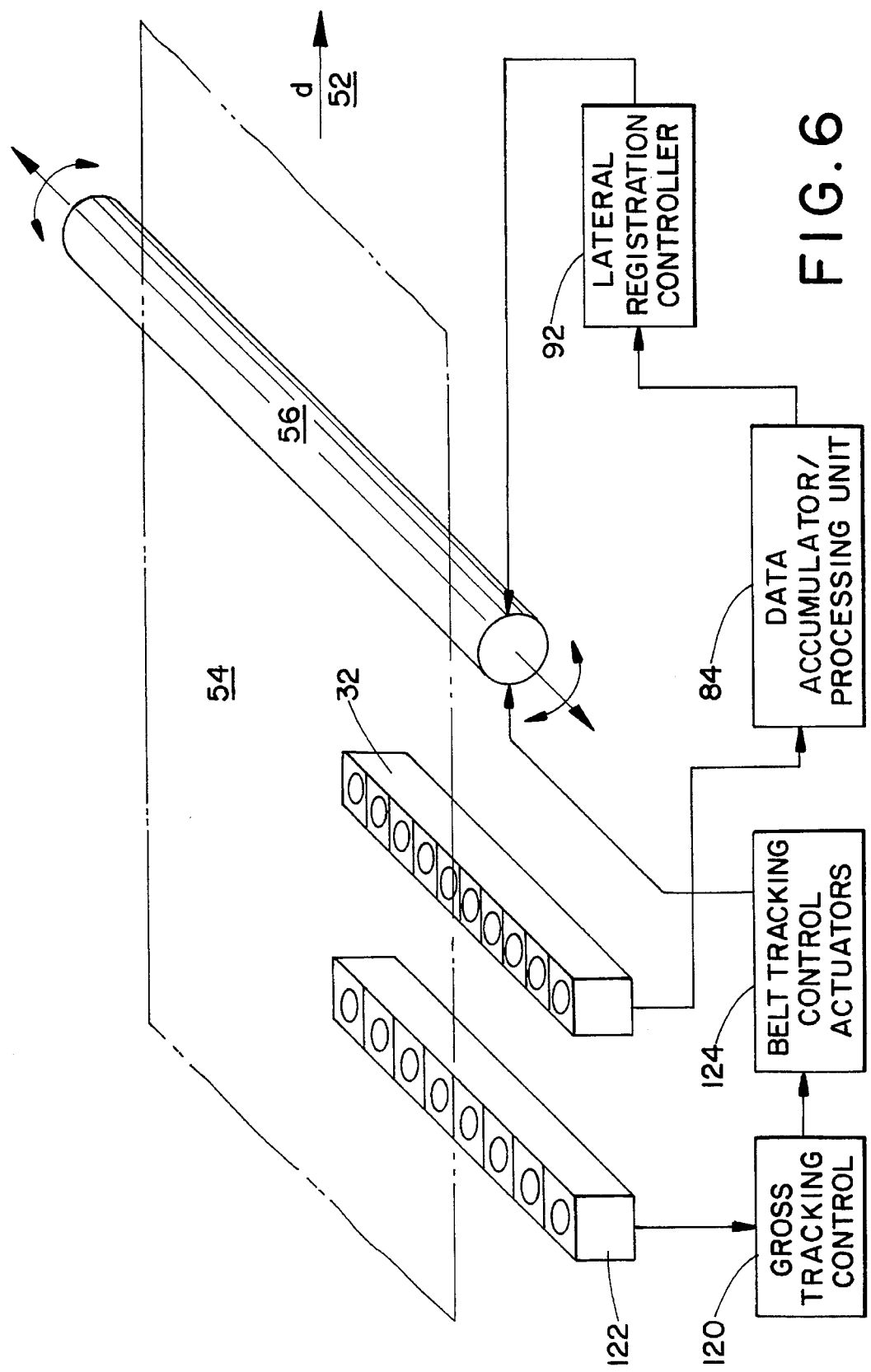
FIG. 6 is a schematic perspective view illustrating a system incorporating another embodiment of the invention and for providing registration of multiple exposures on a photoconductive belt using a steering control.

In FIG. 6, an overall belt steering system embodiment of the invention is schematically illustrated in a functional block diagram. The photoconductor belt 54 is shown in a developed view, as if it were cut at the loop seam and stretched flat. Also such equivalent components previously described with reference to FIGS. 3–5, including the central controller (data accumulator/processing unit) 34 and a transducer (lateral registration controller feedback) 42 are schematically represented. In FIG. 6, the belt is shown with a single representative sensor or scanner 32 to provide a signal corresponding to lateral belt position for steering the belt in a manner which will be described in more detail with reference to FIGS. 7–9.

Figure 7:
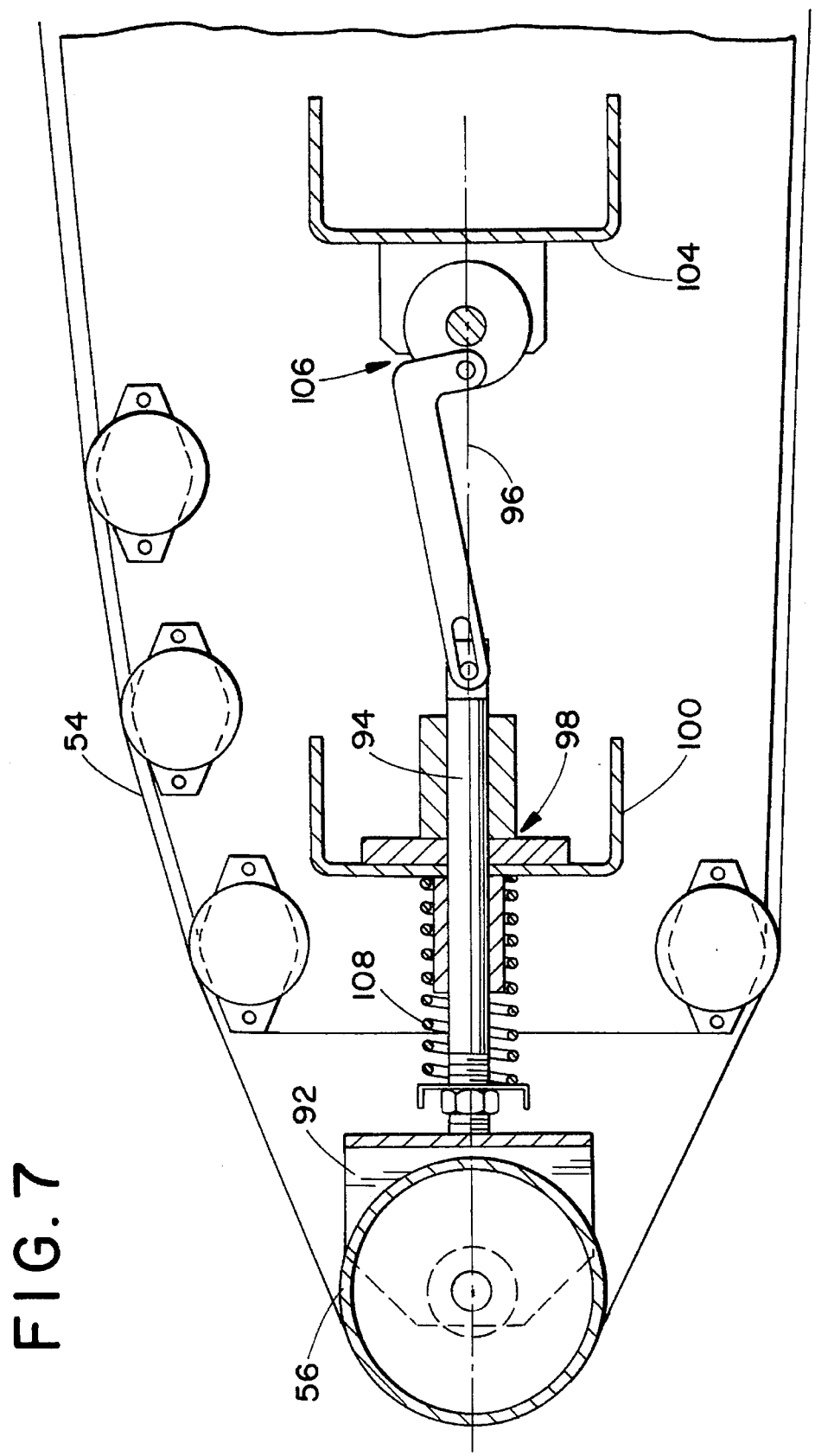
FIG. 7 is an enlarged fragmentary longitudinal cross section depicting a belt steering mechanism for use with the embodiment of FIG. 6 of the present invention.

As shown in FIGS. 7–9, the steering roller 56 is supported for rotation on an axis 91 by a yoke 92 which, in turn, is carried at the end of a shaft 94 supported for rotation on a central longitudinal axis 96 which extends substantially parallel to the direction of belt travel. The shaft 94 is supported for both rotational and longitudinal movement in a bearing assembly 98 supported by a transverse beam 100 extending between opposite side walls 101 and 102. The side walls 101 and 102 and the beam 100 form part of the support structure for the belt 54. Such support structure is only partially illustrated in the drawings but further includes a transverse beam 104 spaced from the beam 100. The beam 104 supports a crank mechanism 106 which cooperates with a compression spring 108 to control the longitudinal position of the steering guide roller 56 on the axis 96.

As illustrated in FIGS. 8 and 9, control of the angular position of the steering roller 56 about the axis 96 is effected by a stepping motor 110 fixed to the side wall 101 and having a final output shaft 112 connected to a cam 114 (FIG. 9). Although not shown, the stepping motor may include reduction gearing in advance of the output shaft 112. The cam 114, in the illustrated embodiment, underlies a follower plate 116 secured to an end of the yoke 92. A compression spring 118 biases the follower plate 116 into engagement with the cam 114 at all times. Thus, it will be appreciated that rotational movement of the cam 114 on the shaft 112 of the stepping motor 110 will operate to tilt the steering roller 56 about the central longitudinal axis 96 in one direction, whereas the spring 118 will bias the yoke 92 to tilt the roller 56 in the opposite direction. Thus, the contour and angular position of the cam will control the tilted position of the steering roller 56 at all times.

The system broadly represented in FIG. 6 includes the steering control apparatus illustrated in FIGS. 7–9 and also includes a gross tracking control processor 120, a gross belt edge sensor 122 and a gross belt tracking control actuator connected to the steering roller 56. All of the gross steering or belt tracking apparatus 120, 122 and 124 provide for the control of the belt to within the quasi-steady state parameters discussed above. Fine lateral registration control over the belt according to a belt steering embodiment of the invention includes digital controller 34 which is provided with signal averaging, compensator and motor control modules. The stepper motor 110 is operated by a power drive controlled by the motor control module of the digital controller 34.

IMAGE REGISTRATION USING SUBSTANTIALLY FIXED LED ARRAY

Figure 10:
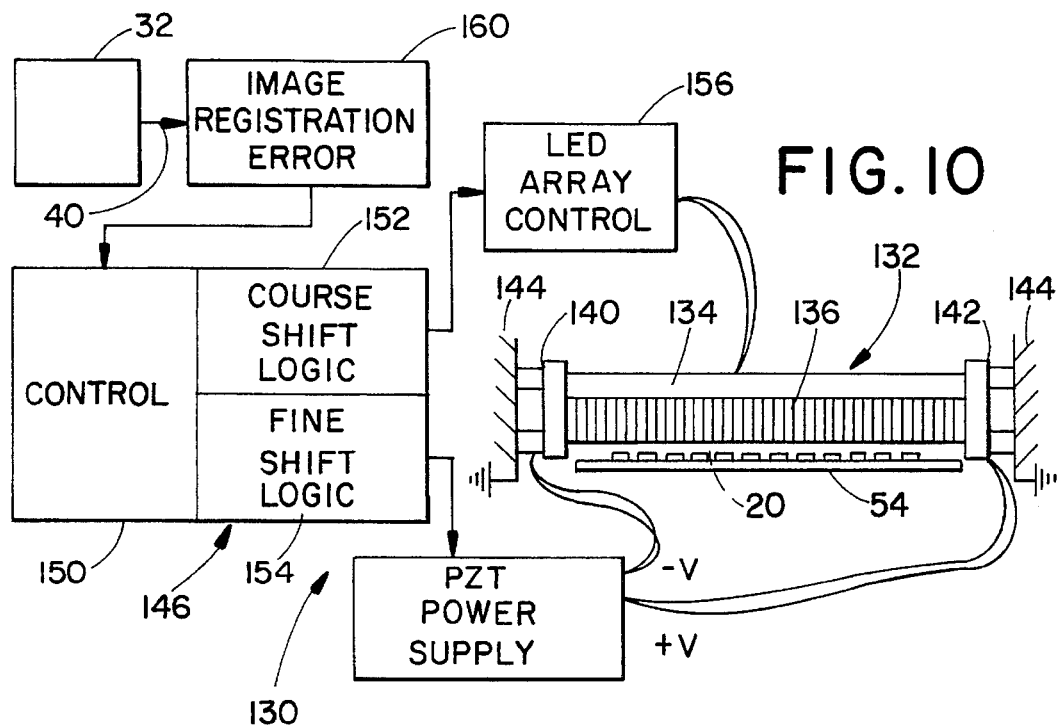
FIG. 10 is a schematic perspective view illustrating a system incorporating another embodiment of the invention and for providing for multiple exposures on a photoconductive belt by multiple passes of image areas on the belt in relation to a single fixed LED-type raster output scanner.
Figure 11:
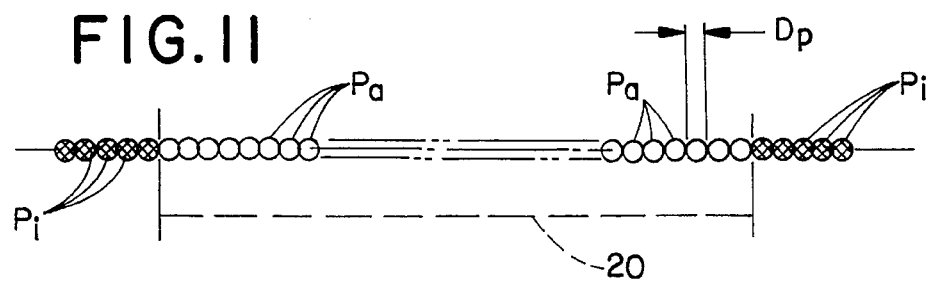
FIG. 11 is a schematic view illustrating operation of the LED array of FIG. 10 as a pattern of active and inactive pixels.
Figure 12:
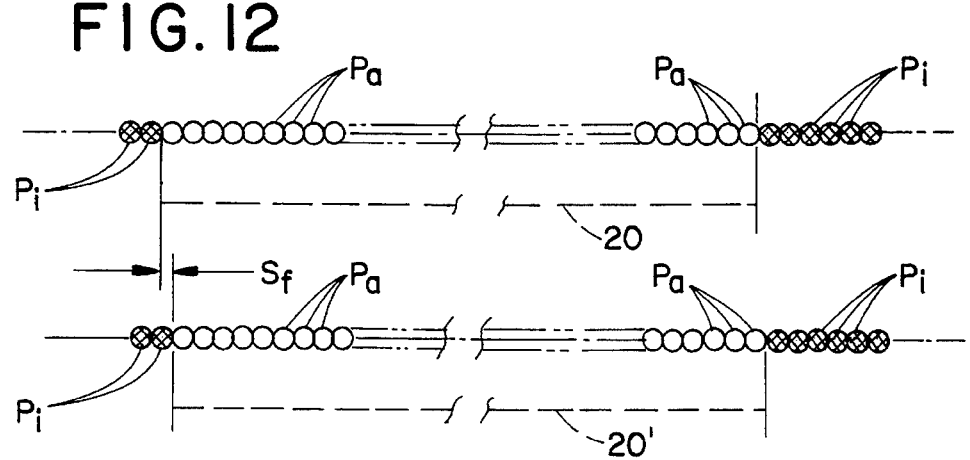
FIG. 12 is a view similar to FIG. 11 but schematically depicting the manner in which the scan line of the LED array of FIG. 10 is shifted.

In FIGS. 10–12 of the drawings, the invention is embodied in system 130 shown to include an LED raster output scanner 132 positioned above a photoconductive belt 54. The scanner 132 includes an LED array 134 and a selfoc lens group 136 by which image light is transmitted from the LED array 134 to a transverse scan line 20 on the belt 54. The LED array is supported at opposite ends by piezoelectric stacks 140 and 142 which extend to fixed supports 144.

The system 130 further includes a control processor 146 having a control module 150, a course shift logic module 152 and a fine shift logic module 154. The course shift logic module has an input to an LED array control unit 156 by which image information is supplied to the LED array 134. A belt edge lateral registration error processor 160 receives error correction signal information originating within central controller 32 developed as described above with respect to FIGS. 2–5 of the drawings. As depicted in FIG. 10, the belt lateral registration error signal information 40 is supplied to the control module of the control processor 146.

The manner in which the system 130 is operated to shift the active line scan of the raster output scanner 132 in response to belt lateral position error may be understood by reference to FIGS. 11 and 12 of the drawings. As shown in FIG. 11, the length of the scanner 132 exceeds the length of the image transverse scan line 20 so that the exposure of any given raster line on the photoconductive belt 54 will entail exposure illumination by less than the total number of LEDs in the array 134. This characteristic is represented in FIG. 11 by a transverse line of pixels in which exposed pixels are represented by white circles $P_a$ whereas inactive or non-exposed pixels are represented by black circles $P_i$. The diameter of each pixel is represented in FIG. 11 by the dimension $D_p$.

It will be appreciated from the illustration in FIG. 11 that the image transverse scan line 20, may be shifted to the right or to the left in increments corresponding to the pixel diameter $D_p$. This operation may be effected by operation of the LED array control 156 and in accordance with the present invention is so controlled by the course shift logic module of the processor 146 in response to an image registration error signal representing a required shift of that magnitude.

In addition to the increment of transverse shifting depicted in FIG. 11, and as shown in FIG. 12, a further or fine shifting of the transverse location of the image line of scan line 20 may be effected by physically shifting the raster output scanner 132. A shift of this nature is represented in FIG. 12 by the dimension $S_f$ and in practice need not be any greater than the radius of the LED pixels or one half the dimension $D_p$. Such fine shifting is effected by operation of the piezoelectric stacks 140 and 142 under the control of the fine shift logic module 154 of the processor 146.

The provision of course and fine shifting of the line of scan 20 exemplified by the embodiment of FIGS. 10–12 is advantageous because it optimizes electronic control and hence the speed in which the scanner 132 may be adjusted in response to a detected lateral shifting of the belt 54 between successive image area exposures. Because the measure of physical shifting movement of the raster output scanner is limited to a portion of the pixel diameter $D_p$, however, a variety of physical drive devices may be substituted for the piezoelectric stacks 140 and 142 in the practice of the invention. For example, an electronically controlled stepper motor and a lead screw or cam may be used for the required physical shifting of the scanner 132. Also, a piezoelectric "inch worm" drive, in which linear motion is achieved by successive clamping, extending and unclamping of three separate driving piezoelectric cylinders about a drive cylindrical shaft connected to the scanner 132, may be used. As another example, a single piezoelectric stack such as 140 can be used while the opposite end of raster output scanner 132 is simply guided and free to move laterally.

It will be apparent to those skilled in the art that various modifications and variations can be made in the method and apparatus of the present invention and in construction of the illustrated embodiments without departing from the scope or spirit of the invention. For example, the photoconductor belt edge sensors may be combined into a single device and suitably shared between the gross tracking control and the registration control in a time division fashion.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Having thus described the invention, we now claim:

1. A method for transverse registration of an image area to be exposed on a longitudinally moving belt subject to lateral deviation from linear travel, said method comprising the steps of:

provide belt edge profile data relating i) each of a plurality of longitudinal positions along said moving belt to ii) a lateral position of an edge of the belt with respect to a spatially fixed reference point;

detecting a first lateral position of said belt during movement of the belt by measuring the lateral position of said belt edge at a first one of said plurality of longitudinal positions along said belt; and, adjusting the transverse location of the image area on the belt by shifting an active scan line to compensate for a difference between the detected first lateral position of said belt edge and the belt edge profile data related to said first one of said plurality of longitudinal positions.

2. The method for transverse registration of an image area according to claim 1 wherein:

the step of providing said belt edge profile data includes the step of providing average belt edge profile data relating i) each of said plurality of longitudinal positions along said belt repeatedly passing adjacent said spatially fixed reference point to ii) an average lateral position of said belt edge at each of said plurality of longitudinal positions along said belt with respect to said spatially fixed reference point; and, the step of adjusting the transverse location of the image area includes the step of adjusting the transverse location of the image area on the belt to compensate for a difference between the detected first lateral position of said belt edge and the average belt edge profile data related to said first one of said plurality of longitudinal positions.

3. The method for transverse registration of an image area according to claim 2 wherein:

the step of providing said average belt edge profile data includes the step of providing moving average belt edge profile data relating i) each of said plurality of longitudinal positions along said belt passing adjacent said spatially fixed reference point for a predetermined number of belt cycles to ii) an average lateral position of said belt edge at each of said plurality of longitudinal positions along said belt with respect to said spatially fixed reference point for said predetermined number of belt cycles; and, the step of adjusting the transverse location of the image area includes the step of adjusting the transverse location of the image area on the belt to compensate for a difference between the detected first lateral position of said belt edge and the moving average belt edge profile data related to said first one of said plurality of longitudinal positions.

4. The method for transverse registration of an image area according to claim 1 wherein the active scan line is shifted in a transverse direction.

5. The method for transverse registration of an image area according to claim 1 further including generating the active scan line from a transverse scan line which has a length greater than a length of the active scan line.

6. The method for transverse registration of an image area according to claim 5 wherein the length of the transverse scan line is greater than a length of the image area.

7. A method for transverse registration of an image area to be exposed on a longitudinally moving belt subject to lateral deviation from linear travel, said method comprising the steps of:

providing belt edge profile data relating i) each of a plurality of longitudinal positions along said moving belt to ii) a lateral position of an edge of the belt with respect to a spatially fixed reference point;

detecting a first lateral position of said belt during movement of the belt by measuring the lateral position of said belt edge at a first one of said plurality of longitudinal positions along said belt;

adjusting the transverse location of the image area on the belt to compensate for a difference between the detected first lateral position of said belt edge and the belt edge profile data related to said first one of said plurality of longitudinal positions; and determining when said longitudinally moving belt reaches a quasi steady state in said lateral deviation from linear travel by, calculating moving average belt edge profile data relating i) each of said plurality of longitudinal positions along said belt passing adjacent said spatially fixed reference point for a predetermined number of belt cycles to ii) an average lateral position of said belt edge at each of said plurality of longitudinal positions along said belt with respect to said reference point for said predetermined number of belt cycles, detecting a first lateral position data set of said belt during movement of the belt by measuring the lateral position of said belt edge at said plurality of longitudinal positions along said belt, calculating a plurality of difference data values by comparing said moving average belt edge profile data with said first lateral position data set for each of said plurality of longitudinal positions along said belt, and realizing said quasi steady state when each of said plurality of difference data values are within a predetermined value range.

8. The method for transverse registration of an image area according to claim 7 wherein:

the step of providing said belt edge profile data includes the step, after realizing said quasi steady state, of providing moving average belt edge profile data relating i) each of said plurality of longitudinal positions along said belt passing adjacent said spatially fixed reference point for a predetermined number of belt cycles to ii) an average lateral position of said belt edge at each of said plurality of longitudinal positions along said belt with respect to said reference point for said predetermined number of belt cycles; and, the step of adjusting the transverse location of the image area includes the step, after realizing said quasi steady state, of adjusting the transverse location of the image area on the belt to compensate for a difference between the detected first lateral position of said belt edge and the moving average belt edge profile data related to said first one of said plurality of longitudinal positions.

9. The method for transverse registration of an image area according to claim 8 further comprising the steps, for each of said plurality of longitudinal positions along said belt, of:

on-the-fly detecting a lateral position of said belt during movement of the belt by measuring the lateral position of said belt edge from said spatially fixed reference point; and, on-the-fly adjusting the transverse location of the image area on the belt to compensate for a difference between the detected lateral position of said belt edge and the moving average belt edge profile data.

10. A method for controlling a lateral position of a longitudinally moving endless belt subject to lateral deviation from linear travel, said method comprising the steps of:

providing belt edge profile data relating i) each of a plurality of longitudinal positions along said moving belt to ii) a lateral position of an edge of the belt with respect to a spatially fixed reference point;

detecting a first lateral position of said belt during movement of the belt by measuring the lateral position of said belt edge at a first one of said plurality of longitudinal positions along said belt;

generating a steering command signal by calculating a difference between the detected first lateral position of said belt edge and the belt edge profile data related to said first one of said plurality of longitudinal positions; and, adjusting the lateral positions of the belt in response to said steering command signal while simultaneously performing the detecting and generating steps, whereby continuous updating of the lateral position of the belt is achieved.

11. The method for controlling a lateral position of a longitudinally moving endless belt according to claim 10 wherein:

the step of providing said belt edge profile data includes the step of providing average belt edge profile data relating i) each of said plurality of longitudinal positions along said belt repeatedly passing adjacent said spatially fixed reference point to ii) an average lateral position of said belt edge at each of said plurality of longitudinal positions along said belt with respect to said reference point; and, the step of generating said steering command signal includes the step of generating said steering command signal by calculating a difference between the detected first lateral position of said belt edge and the average belt edge profile data related to said first one of said plurality of longitudinal positions.

12. The method for controlling a lateral position of a longitudinally moving endless belt according to claim 11 wherein:

the step of providing said average belt edge profile data includes the step of providing moving average belt edge profile data relating i) each of said plurality of longitudinal positions along said belt passing adjacent said spatially fixed reference point for a predetermined number of belt cycles to ii) an average lateral position of said belt edge at each of said plurality of longitudinal positions along said belt with respect to said reference point for said predetermined number of belt cycles; and, the step of generating said steering command signal includes the step of generating said steering command signal by calculating a difference between the detected first lateral position of said belt edge and the moving average belt edge profile data related to said first one of said plurality of longitudinal positions.

13. A method for controlling a lateral position of a longitudinally moving endless belt subject to lateral deviation from linear travel, said method comprising the steps of:

providing belt edge profile data relating i) each of a plurality of longitudinal positions along said moving belt to ii) a lateral position of an edge of the belt with respect to a spatially fixed reference point;

detecting a first lateral position of said belt during movement of the belt by measuring the lateral position of said belt edge at a first one of said plurality of longitudinal positions along said belt;

adjusting the transverse location of the image area on the belt to compensate for a difference between the detected first lateral position of said belt edge and the belt edge profile data related to said first one of said plurality of longitudinal positions; and determining when said longitudinally moving belt reaches a quasi steady state in said lateral deviation from linear travel by, calculating moving average belt edge profile data relating i) each of said plurality of longitudinal positions along said belt passing adjacent said spatially fixed reference point for a predetermined number of cycles to ii) an average lateral position of said belt edge at each of said plurality of longitudinal positions along said belt with respect to said reference point for said predetermined number of belt cycles, detecting a first lateral position data set of said belt during movement of said belt by measuring the lateral position of said belt edge at said plurality of longitudinal positions along said belt, calculating a plurality of difference data values by comparing said moving average belt edge profile data with said first lateral position data set for each of said plurality of longitudinal positions along said belt, and realizing said quasi steady state when each of said plurality of difference data values are within a predetermined value range.

14. The method for controlling a lateral position of a longitudinally moving endless belt according to claim 13 further comprising the step of determining when said longitudinally moving belt reaches a quasi steady state in said lateral deviation from linear travel by:

calculating moving average belt profile data relating i) each of said plurality of longitudinal positions along said belt passing adjacent said spatially fixed reference point for a predetermined number of belt cycles;

detecting a first lateral position data set of said belt during movement of the belt by measuring the lateral position of said belt edge at said plurality of longitudinal positions along said belt;

calculating a plurality of difference data values by comparing said moving average belt edge profile data with said first lateral position data set for each of said plurality of longitudinal positions along said belt; and, realizing said quasi steady state when each of said plurality of difference data values are within a predetermined value range.

15. The method for controlling a lateral position of a longitudinally moving endless belt according to claim 14 wherein:

the step of providing said belt edge profile data includes the step, after realizing said quasi steady state, of providing moving average belt edge profile data relating i) each of said plurality of longitudinal positions along said belt passing adjacent said spatially fixed reference point for a predetermined number of belt cycles to ii) an average lateral position of said belt edge at each of said plurality of longitudinal positions along said belt with respect to said reference point for said predetermined number of belt cycles; and, the step of generating said steering command signal includes the step, after realizing said quasi steady state, of generating said steering command signal by calculating a difference between the detected first lateral position of said belt edge and the moving average belt edge profile data related to said first one of said plurality of longitudinal positions.

16. The method for controlling a lateral position of a longitudinally moving endless belt according to claim 15 further comprising the steps, for each of said plurality of longitudinal positions along said belt, of:

on-the-fly detecting a lateral position of said belt during movement of the belt by measuring the lateral position of said belt edge from said fixed reference point;

on-the-fly generating said steering command signal by calculating a difference between the detected lateral position of said belt edge and the moving average belt edge data; and, on-the-fly adjusting the lateral position of the belt in response to said steering command.

* * * * *